UNITED STATES PATENT OFFICE.

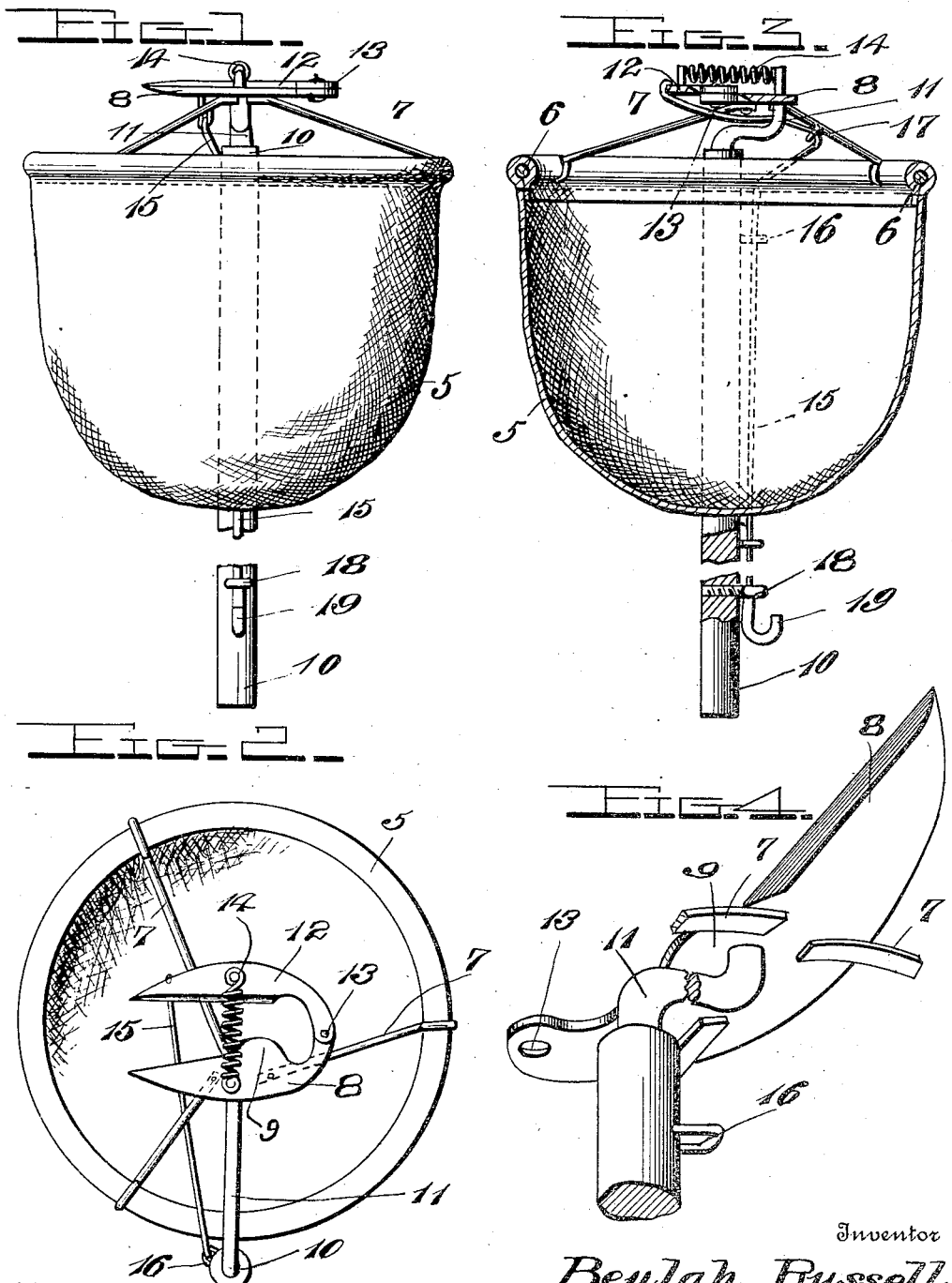

BEULAH RUSSELL, OF LOUISVILLE, TENNESSEE.

FRUIT-GATHERING DEVICE.

1,023,881.　　　　Specification of Letters Patent.　　Patented Apr. 23, 1912.

Application filed January 4, 1912. Serial No. 669,300.

*To all whom it may concern:*

Be it known that I, BEULAH RUSSELL, a citizen of the United States, residing at Louisville, in the county of Blount and State of Tennessee, have invented certain new and useful Improvements in Fruit-Gathering Devices, of which the following is a specification, reference being had to the accompanying drawings.

This invention relates to fruit gathering devices and has for its object to provide means whereby fruits may be easily and quickly gathered without danger of bruising the same.

A further object of the invention is to provide a fruit gathering device of simple, efficient and durable construction and one which may be manufactured and sold at a nominal cost.

With the above and other objects in view, the invention consists of the novel features of construction, combination and arrangement of parts hereinafter fully described and claimed, and illustrated in the accompanying drawings, in which—

Figure 1 is a side elevation of a fruit gathering device embodying my improvements; Fig. 2 is a top plan view thereof; Fig. 3 is a vertical section; and Fig. 4 is a detail perspective view of the stationary knife blade.

Referring in detail to the drawing 5 designates a fruit receiving bag or sack, the edge of which at its open end is sewed upon and incloses a comparatively rigid metal ring 6. To this metal ring a plurality of spaced radially disposed inwardly and upwardly inclined wire rods 7 are secured. The inner ends of these radial rods are rigidly fixed to the intermediate enlarged portion 9 of a stationary knife blade 8. To this enlargement of the knife blade a shank 11 fixed in the end of a handle 10 is also rigidly secured.

To one end of the knife blade 8 a movable knife blade 12 is pivotally connected as indicated at 13, and to said movable blade one end of a spring 14 is connected, the other end of the spring being secured to the enlargement 9 of the stationary blade 8. The handle 10 may be made of any desired length and a wire 15 extends along the side of the same through a guide loop 16. The upper end of said wire is disposed through a second guide loop 17 fixed to one of the radial wires 7 of the basket frame and has its extremity connected to the movable knife blade 12. The lower end of the wire 15 is movable through an eye formed in the end of a short bolt or rivet 18 which is fixed to the handle 10. The wire is also provided at its lower end with a suitable finger-piece 19 which engages with the bolt 18 to limit its upward movement. This finger-piece 19 on the lower end of the wire is disposed at a sufficient distance from the lower end of the pole or handle 10 to permit the same to be engaged and actuated by the finger of the operator while the handle is resting upon the ground, so that the operator will not be required to support the weight of the fruit contained in the bag or sack 5 when the fruit is being picked from the lower branches of the tree.

From the foregoing it is believed that the construction and manner of use of my improved fruit gathering device will be fully understood without necessitating any further description. The same is simple in construction, and may be easily and quickly operated by the user with a minimum amount of labor to gather large quantities of fruit.

While I have shown and described the preferred construction and arrangement of the various parts, it will be understood that the invention is susceptible of considerable modification without departing from the essential feature or sacrificing any of the advantages thereof.

Having thus described the invention what is claimed is:—

1. In a fruit gathering device, the combination of a receptacle having a frame arranged in the open end thereof, said frame comprising an annular wire ring and a plurality of inwardly extending radial wires fixed thereto, a stationary horizontally disposed knife blade centrally arranged above said receptacle, said wires being rigidly secured to the knife blade at their inner ends, a movable knife blade pivotally mounted at one end upon the stationary blade, a spring connecting said movable blade to the stationary blade and normally holding said blades in spaced relation, a pole rigidly fixed to the stationary blade, and means mounted upon said pole and connected to the movable blade to actuate the same and sever the fruit.

2. In a fruit gathering device, the combination of a receptacle having a frame arranged in its open end, said receptacle comprising an annular metal ring and a plurality of radially disposed inwardly and upwardly inclined wires fixed to said ring, a stationary knife blade having a central enlarged portion, the inner ends of said radial wires being rigidly fixed to the knife blade, a movable knife blade pivotally connected to one end of the stationary blade, a spring connected at one end to the movable blade and at its other end to the enlarged portion of the stationary blade, a pole rigidly fixed at its upper end to the enlargement of the stationary blade, an operating wire extending along the side of said pole and having its upper end connected to said movable knife blade to actuate the same, a guide loop for said wire secured to one of the radial frame wires, a guide loop for the wire secured to said pole, a finger-piece on the lower end of said wire, and a stop member fixed to the handle to be engaged by the finger-piece and limit the movement of the pivoted knife blade in one direction.

In testimony whereof I hereunto affix my signature in the presence of two witnesses.

BEULAH RUSSELL.

Witnesses:
JAMES F. BEALS,
S. A. BEALS.